United States Patent
Okada et al.

(10) Patent No.: US 7,427,304 B2
(45) Date of Patent: Sep. 23, 2008

(54) FUEL GAS MANUFACTURING APPARATUS

(75) Inventors: Hikaru Okada, Asaka (JP); Satoshi Hanai, Suzaka (JP); Hideaki Sumi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 508 days.

(21) Appl. No.: 11/056,600

(22) Filed: Feb. 11, 2005

(65) Prior Publication Data

US 2005/0178062 A1 Aug. 18, 2005

(30) Foreign Application Priority Data

Feb. 12, 2004 (JP) ............... 2004-034541

(51) Int. Cl.
*C10J 3/84* (2006.01)
*C10J 3/00* (2006.01)
*B01J 7/00* (2006.01)
*C01B 3/36* (2006.01)
*C01B 3/32* (2006.01)

(52) U.S. Cl. ................. 48/128; 48/61; 48/197 R; 48/198.7; 48/211

(58) Field of Classification Search ............ 48/61, 48/128, 127.9, 211, 198.7, 197 R
See application file for complete search history.

(56) References Cited

U.S. PATENT DOCUMENTS

| | | | |
|---|---|---|---|
| 3,141,748 A | | 7/1964 | Hoke |
| 5,112,590 A | * | 5/1992 | Krishnamurthy et al. . 423/418.2 |
| 5,137,547 A | * | 8/1992 | Chretien .................. 95/55 |
| 5,203,888 A | | 4/1993 | Maurer |
| 6,277,338 B1 | * | 8/2001 | Agee et al. .............. 422/189 |
| 6,458,478 B1 | * | 10/2002 | Wang et al. .............. 429/17 |
| 6,497,856 B1 | * | 12/2002 | Lomax et al. ............. 423/651 |
| 6,740,258 B1 | | 5/2004 | Wyschofsky et al. |
| 6,929,668 B2 | | 8/2005 | Millet et al. |
| 2002/0031690 A1 | * | 3/2002 | Shimazu et al. ........... 429/19 |
| 2004/0121199 A1 | * | 6/2004 | Balan et al. ............. 429/14 |
| 2004/0179998 A1 | * | 9/2004 | Gittleman et al. ......... 423/650 |
| 2004/0250472 A1 | * | 12/2004 | Okada et al. ............. 48/214 A |

(Continued)

FOREIGN PATENT DOCUMENTS

EP 0015413 B1 2/1983

(Continued)

OTHER PUBLICATIONS

Japanese Office Action for Application No. 2004-034541, dated Jul. 10, 2007.

(Continued)

*Primary Examiner*—Walter D. Griffin
*Assistant Examiner*—Huy-Tram Nguyen
(74) *Attorney, Agent, or Firm*—Lahive & Cockfield, LLP; Anthony A. Laurentano, Esq.

(57) ABSTRACT

A PSA mechanism has a plurality of adsorption towers having inlet/outlet ends connected to respective valves that are connected to an off-gas discharge passage. The off-gas discharge passage is connected to an off-gas ejector of a residual gas supply. The off-gas ejector has a function to draw an off gas from the PSA mechanism with compressed air that is caused by an air compressor to flow from an off-gas discharging air supply passage into an off-gas passage.

6 Claims, 7 Drawing Sheets

U.S. PATENT DOCUMENTS

| | | | |
|---|---|---|---|
| 2005/0178062 A1* | 8/2005 | Okada et al. | 48/128 |
| 2005/0183336 A1* | 8/2005 | Sumi et al. | 48/128 |
| 2005/0193627 A1* | 9/2005 | Zhang et al. | 48/198.7 |
| 2005/0210881 A1* | 9/2005 | Balan et al. | 60/780 |
| 2006/0137246 A1* | 6/2006 | Kumar et al. | 48/61 |
| 2007/0214719 A1* | 9/2007 | Yoshikawa | 48/61 |

FOREIGN PATENT DOCUMENTS

| | | |
|---|---|---|
| EP | 0620035 A1 | 10/1994 |
| EP | 0864350 A2 | 9/1998 |
| EP | 0864351 A2 | 9/1998 |
| EP | 1101731 A1 | 5/2001 |
| JP | 2-252604 | 11/1990 |
| JP | 5-116903 | 5/1993 |
| JP | 10-314532 | 12/1998 |
| JP | 11-335101 | 12/1999 |
| JP | 2002-020102 | 1/2002 |
| JP | 2003-531795 | 10/2003 |
| JP | 2005-41732 | 2/2005 |

OTHER PUBLICATIONS

European Office Action for Application No. 05002504.8-1218, dated Apr. 15, 2008.

* cited by examiner

FUEL GAS MANUFACTURING APPARATUS

BACKGROUND OF THE INVENTION

1. Field of the Invention

The present invention relates to a fuel gas manufacturing apparatus for manufacturing a hydrogen-rich fuel gas by modifying a hydrogen-containing fuel which contains hydrocarbon, alcohol, or the like.

2. Description of the Related Art

There has been employed in the art a hydrogen manufacturing apparatus (fuel gas manufacturing apparatus) for modifying a hydrocarbon fuel such as natural gas or the like or a hydrogen-containing fuel containing alcohol such as methanol or the like to produce a hydrogen-containing gas (modified gas) and supplying the hydrogen-containing gas as a fuel gas to a fuel cell or the like.

Such a hydrogen manufacturing apparatus basically operates to modify a hydrocarbon fuel such as an LPG (liquefied petroleum gas), a city gas, or the like with water vapor to produce a hydrogen-containing gas as a high-concentration hydrogen-rich gas, and separate high-purity hydrogen from the hydrogen-containing gas with a PSA (Pressure Swing Adsorption) device according to pressure adsorption.

Specifically, a hydrogen-containing gas produced by modifying a hydrocarbon fuel with water vapor contains various unwanted materials including CO, $CO_2$, $H_2O$, $CH_4$, etc. in addition to a hydrogen gas as a major component. The PSA device has three adsorption towers, for example, each cyclically operable in adsorption, depressurization, pressure uniformization, blowing-down, and purging processes for extracting high-purity hydrogen and discharging the other components or unwanted materials as an off gas.

Figure 7:
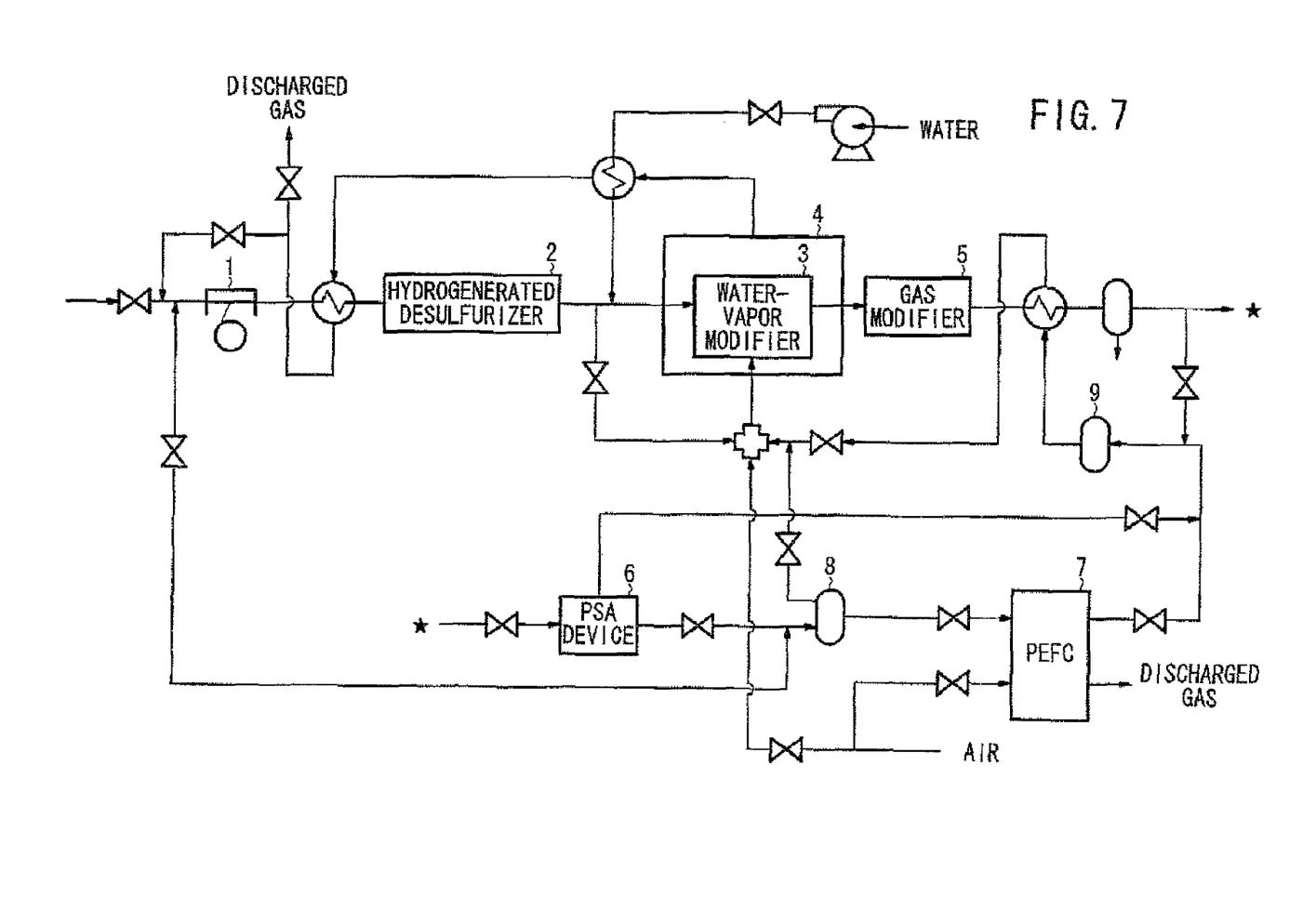
FIG. 7 is a block diagram of a conventional fuel gas manufacturing apparatus.

For example, Japanese Laid-Open Patent Publication No. 2002-20102 discloses a hydrogen manufacturing apparatus basically having, as shown in FIG. 7 of the accompanying drawings, a hydrogenated desulfurizer 2 for being supplied with a fuel such as a city gas or the like from a compressor 1, a water-vapor modifier 3 for modifying a desulfurized fuel with water vapor to produce a high-concentration hydrogen-containing gas (hydrogen-rich gas), a catalytic combustor 4 disposed around the water-vapor modifier 3 for burning hydrogen with oxygen in air in the presence of a catalyst, a gas modifier 5 for converting carbon monoxide contained in the hydrogen-containing gas into carbon dioxide and hydrogen, and a PSA (Pressure Swing Adsorption) device 6 for separating high-purity hydrogen from the hydrogen-containing gas which has been modified by the gas modifier 5 according to pressure adsorption.

The PSA device 6 is connected to a hydrogen storage tank 8 for temporarily storing the high-purity hydrogen before it is supplied to a polymer electrolyte fuel cell (PEFC) 7, and an off-gas holder (off-gas tank) 9 for temporarily storing an off gas (unwanted materials) adsorbed from the high-purity hydrogen by the PSA device 6. The off-gas holder 9 supplies the off gas as a fuel for heating the water-vapor modifier 3 to the catalytic combustor 4.

The PSA device 6 has a plurality of adsorption towers each filled with an adsorbent for selectively adsorbing components other than hydrogen under high pressure and desorbing the adsorbed components under reduced pressure. Each of the adsorption towers cyclically operates in adsorption, desorption, replacement, and pressurization processes for extracting high-purity hydrogen and discharging other components as an off gas.

The off-gas holder 9 needs to be several times greater than the PSA device 6 for effectively performing its function, and hence the hydrogen manufacturing apparatus is of a considerably large size. In particular, the hydrogen manufacturing apparatus with the off-gas holder 9 cannot be used as a hydrogen manufacturing apparatus for household use because an installation space available therefor in households is usually small.

SUMMARY OF THE INVENTION

It is a principal object of the present invention to provide a fuel gas manufacturing apparatus which requires no off-gas tank and includes a small-size PSA mechanism for making the apparatus compact in its entirety.

According to the present invention, there is provided an apparatus for manufacturing a fuel gas, comprising a modifier for modifying a hydrogen-containing fuel to produce a modified gas, a refiner having a PSA mechanism for removing unwanted materials from the modified gas to refine a hydrogen-rich fuel, and a residual gas supply for supplying a residual gas from a tower of the PSA mechanism to a heater. The hydrogen-containing fuel refers to a fuel containing hydrogen, such as hydrocarbon, alcohol, or the like.

The residual gas supply comprises a residual gas passage connected to a compressed-air supply source and the heater, and a residual-gas ejector disposed in the residual gas passage for drawing the residual gas from the tower of the PSA mechanism with compressed air supplied from the compressed-air supply source and flowing through the residual gas passage.

The modifier may comprise an evaporator for evaporating the hydrogen-containing fuel, and the heater may comprise a combustor combined with the evaporator.

The compressed-air supply source may comprise a compressor connected to a modifying-air supply passage communicating with the modifier and the residual gas passage. The modifier may further comprise a hydrogen-containing fuel ejector disposed in the modifying-air supply passage for drawing the hydrogen-containing fuel with modifying air supplied from the compressor and flowing through the modifying-air supply passage.

The modifier may further comprise an atmospheric pressure regulating valve disposed between the hydrogen-containing fuel ejector and a hydrogen-containing fuel supply source for supplying the hydrogen-containing fuel.

When the residual gas is discharged from the PSA mechanism, the residual gas is supplied to the heater and consumed as a combusting fuel. When the pressure at which the residual gas is supplied from the PSA mechanism becomes nil, the residual gas is forcibly discharged from the PSA mechanism by being drawn by the residual gas ejector.

Since a negative pressure is developed in the PSA mechanism by the residual gas ejector, an adsorbent in each tower of the PSA mechanism is reliably regenerated under the negative pressure. Thus, the refining ability of the PSA mechanism is increased, and the PSA mechanism is reduced in size with ease. The apparatus for manufacturing a fuel gas is effectively made compact in its entirety, and can be used as a home hydrogen manufacturing apparatus in particular.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
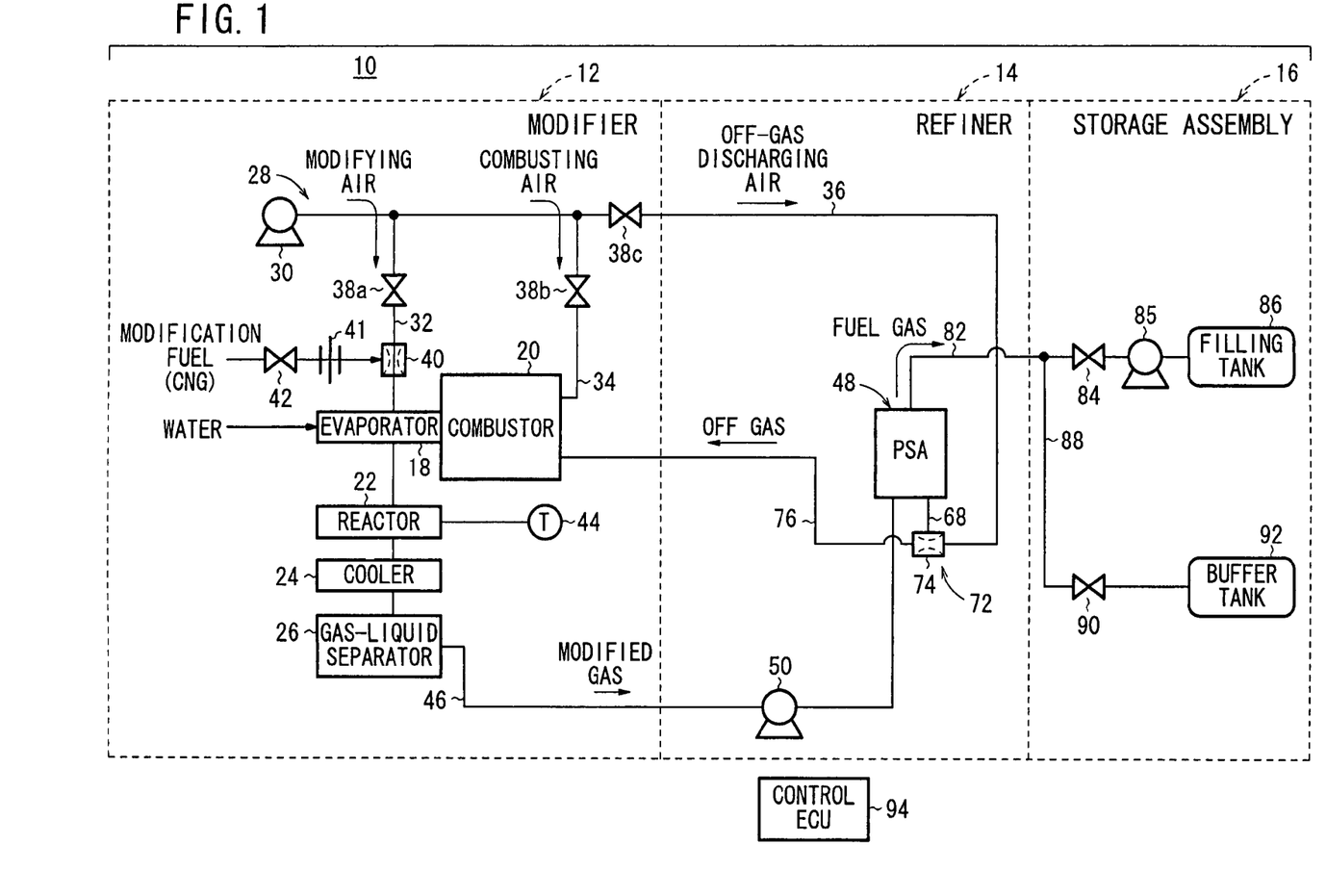
FIG. 1 is a block diagram of a home fuel gas refining system as a fuel gas manufacturing apparatus according to an embodiment of the present invention.

FIG. 1 shows in block form a home fuel gas refining system (fuel gas refining system for household use) 10 as a fuel gas manufacturing apparatus according to an embodiment of the present invention.

As shown in FIG. 1, the home fuel gas refining system 10 has a modifier 12 for modifying a hydrogen-containing fuel, e.g., a hydrocarbon fuel such as methane, propane, or the like (hereinafter referred to as "modification fuel") to produce a hydrogen-rich gas (hereinafter referred to as "modified gas"), a refiner 14 for refining the hydrogen-rich gas into a high-purity hydrogen gas (hereinafter referred to as "fuel gas"), and a storage assembly 16 for storing the fuel gas.

The modifier 12 has an evaporator 18 for evaporating the modification fuel. The evaporator 18 is combined with a combustor (heater) 20 such as a burner or the like. A reactor 22 for modifying the modification fuel into the modified gas is disposed downstream of the evaporator 18. A cooler 24 for cooling the modified gas is disposed downstream of reactor 22. A gas-liquid separator 26 for separating the cooled modified gas into a gaseous component and a water component is disposed downstream of the cooler 24.

The modifier 12 includes an air supply mechanism 28 having an air compressor (compressed-air supply source) 30 which is connected to a modifying-air supply passage 32, a combusting-air supply passage 34, and an off-gas discharging air supply passage 36. The modifying-air supply passage 32 is connected to the evaporator 18. The combusting-air supply passage 34 is connected to the combustor 20. The off-gas discharging air supply passage 36 is connected to the combustor 20 through a PSA mechanism 48 described later.

The modifying-air supply passage 32, the combusting-air supply passage 34, and the off-gas discharging air supply passage 36 can be connected to the air compressor 30 respectively through valves 38a, 38b, 38c. A modification fuel ejector (hydrogen-containing fuel ejector) 40 is disposed between the valve 38a and the evaporator 18. The modification fuel ejector 40 is connected through an orifice 41 to an atmospheric pressure regulating valve 42 that is connected to a modification fuel supply source (not shown). A temperature sensor 44 for detecting the temperature of a modifying catalyst in the reactor 22 is connected to the reactor 22.

The PSA mechanism 48 of the refiner 14 is disposed downstream of and connected to the gas-liquid separator 26 through a modified gas supply passage 46. The PSA mechanism 48 is supplied with a modified gas from which water is separated by the gas-liquid separator 26. A compressor 50 is connected to the modified gas supply passage 46 for delivering the modified gas under pressure to the PSA mechanism 48.

Figure 2:
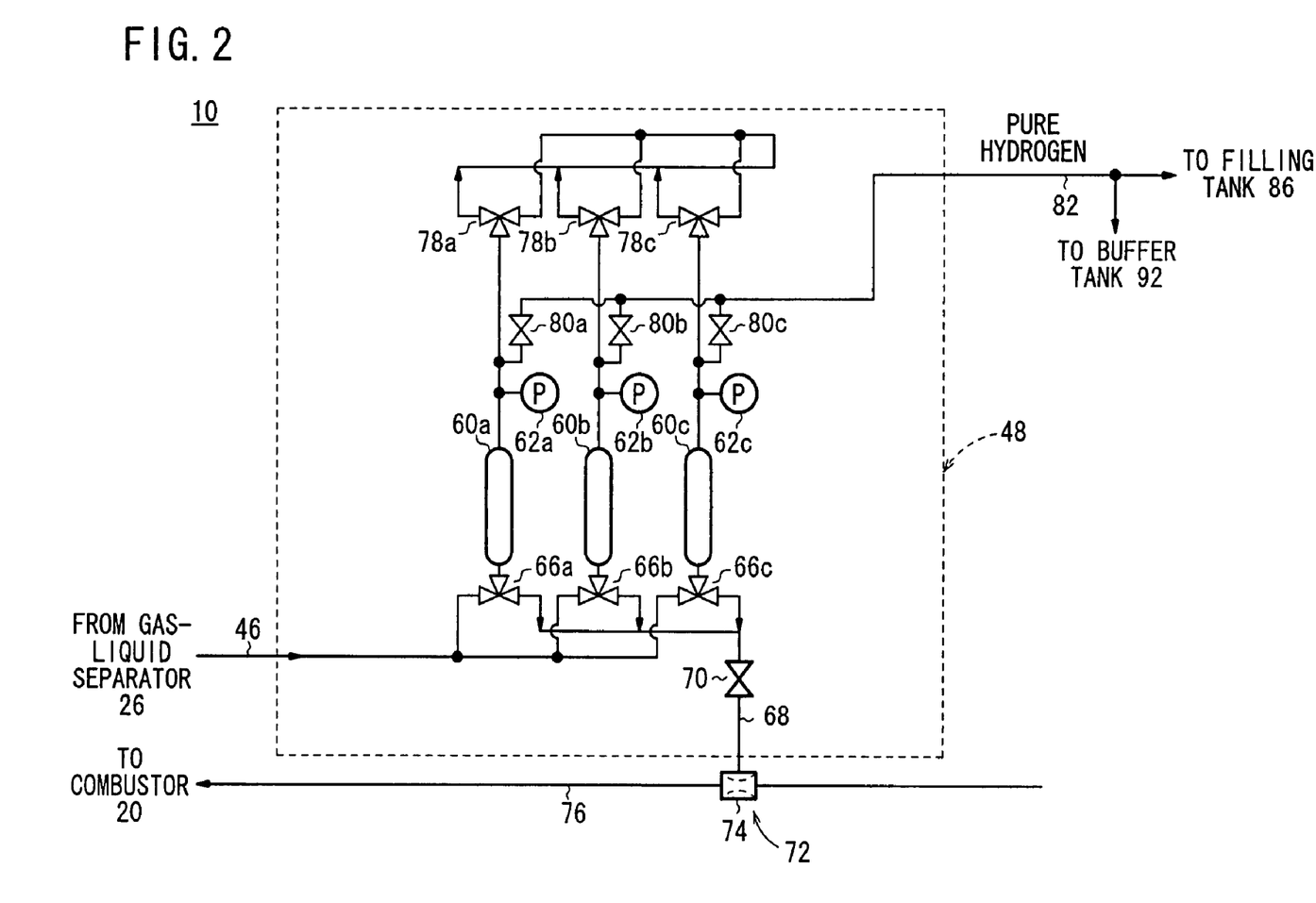
FIG. 2 is a block diagram of a PSA mechanism in the home fuel gas refining system shown in FIG. 1.

As shown in FIG. 2, the PSA mechanism 48 comprises a three-tower swing adsorption device, for example, and has three adsorption towers 60a, 60b, 60c that can individually be connected to the compressor 50. The adsorption towers 60a, 60b, 60c are associated with respective pressure meters 62a, 62b, 62c for detecting the pressures in the adsorption towers 60a, 60b, 60c. The adsorption towers 60a, 60b, 60c have inlet/outlet ends (lower ends) connected to respective valves 66a, 66b, 66c that are connected to an off-gas discharge passage 68.

The off-gas discharge passage 68 has a valve 70 and is connected to an off-gas ejector (residual-gas ejector) 74 of an off-gas supply (residual gas supply) 72. The off-gas ejector 74 has an end connected to the off-gas discharging air supply passage 36 and an opposite end connected to an off-gas passage (residual gas passage) 76. The off-gas ejector 74 has a function to draw an off gas from the PSA mechanism 48 with off-gas discharging air (compressed air) that is caused by the air compressor 30 to flow from the off-gas discharging air supply passage 36 into the off-gas passage 76.

The adsorption towers 60a, 60b, 60c have other inlet/outlet ends (upper ends) connected to respective pressure-uniformizing valves 78a, 78b, 78c and also to respective combustion gas discharging valves 80a, 80b, 80c. The adsorption towers 60a, 60b, 60c can be connected to a fuel gas passage 82 by the combustion gas discharging valves 80a, 80b, 80c. As shown in FIG. 1, the fuel gas passage 82 has an end connected through a valve 84 and a compressor 85 to a filling tank 86 of the storage assembly 16. The fuel gas passage 82 is branched into a fuel gas branch passage 88 connected to a buffer tank 92 by a valve 90 of the storage assembly 16.

The filling tank 86 supplies a fuel gas stored therein to a fuel cell vehicle (not shown). The buffer tank 92 supplies a fuel gas stored therein to a stationary fuel cell (not shown) installed in households for generating electric energy.

The home fuel gas refining system 10 has a control ECU (Electronic Control unit) 94 as a controller for communicating with various accessory units and controlling various components of the home fuel gas refining system 10.

Operation of the home fuel gas refining system 10 thus constructed will be described below.

In the home fuel gas refining system 10, the air compressor 30 is operated by the control ECU 94 to deliver modifying air, combusting air, and off-gas discharging air respectively to the modifying-air supply passage 32, the combusting-air supply passage 34, and the off-gas discharging air supply passage 36.

The modifying air that is delivered to the modifying-air supply passage 32 is supplied to the evaporator 18, which is also supplied with a modification fuel such as a natural gas, a city gas, or the like and water. The combustor 20 is supplied with the combusting air, an off gas, and, if necessary, hydrogen, and a burning process is carried out, enabling the evaporator 18 to evaporate the modification fuel and water.

The evaporated modification fuel is sent from the evaporator 18 to the reactor 22. The reactor 22 simultaneously performs an oxidizing reaction represented by $CH_4 + 2O_2 \rightarrow CO_2 + 2H_2O$ (exothermic reaction) and a fuel modifying reaction represented by $CH_4 + 2H_2O \rightarrow CO_2 + 4H_2$ (endothermic reaction) on methane, for example, in the modification fuel, oxygen in the air, and water vapor (automatic thermal process).

The modified gas that is produced by the reactor 22 is cooled by the cooler 24 and then supplied to the gas-liquid separator 26, which separates water from the modified gas.

The modified gas is then sent from the gas-liquid separator 26 to the modified gas supply passage 46. The modified gas is compressed by the compressor 50 and selectively supplied to the adsorption towers 60a, 60b, 60c of the PSA mechanism 48 (see FIG. 2).

Figure 3:
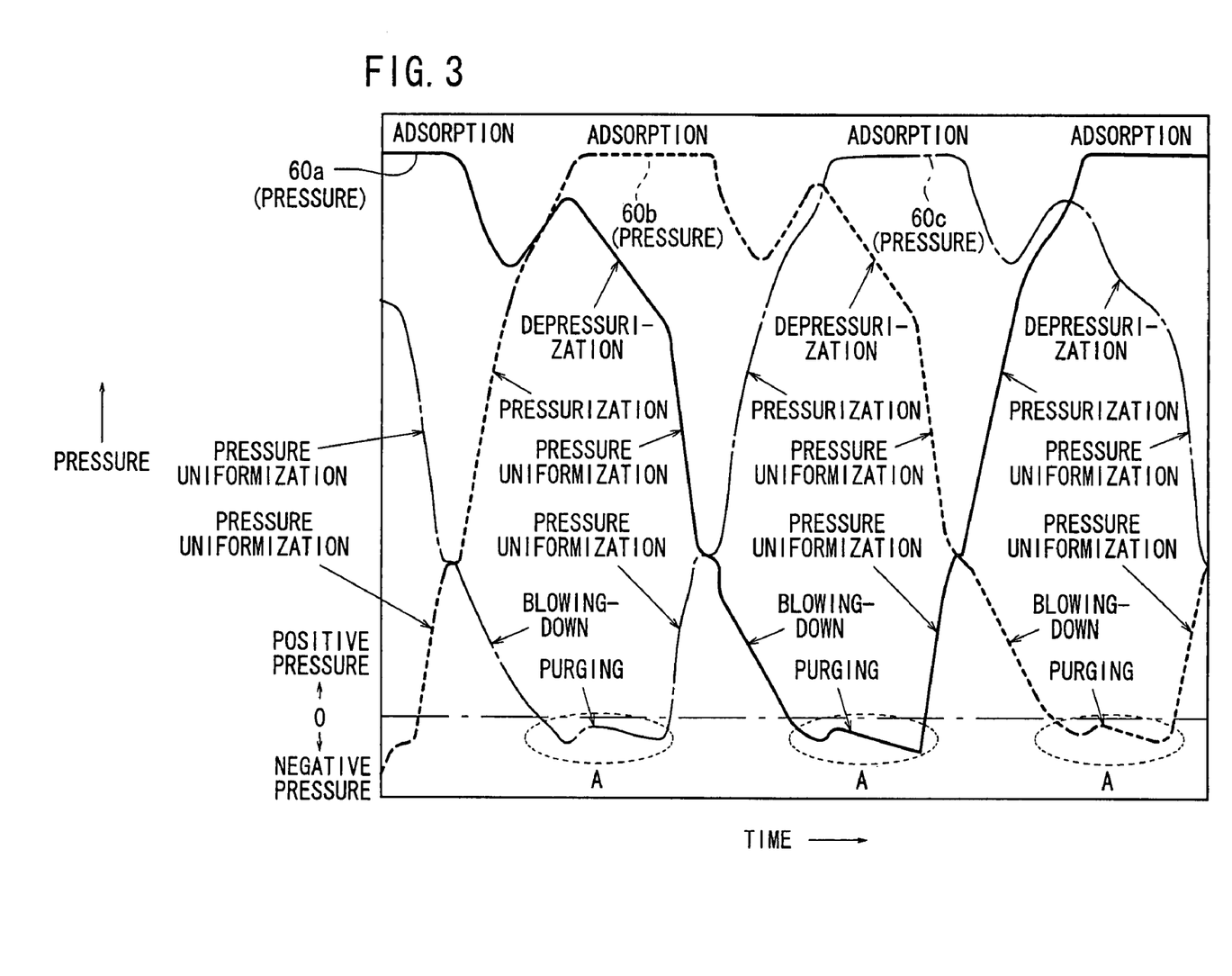
FIG. 3 is a timing chart illustrative of the manner in which the PSA mechanism operates.

As shown in FIG. 3, the adsorption tower 60a performs an adsorption process, the adsorption tower 60b performs a purging process, and the adsorption tower 60c performs a depressurization process, for example, simultaneously. Specifically, the adsorption tower 60a adsorbs components other than hydrogen of the modified gas, thus producing a fuel gas containing high-concentration hydrogen (hydrogen-rich). The valve 80a is then opened to supply the fuel gas from the adsorption tower 60a to the fuel gas passage 82 (see FIG. 2). The fuel gas is then selectively stored in the filling tank 86 and the buffer tank 92 as shown in FIG. 1.

Then, as shown in FIG. 3, the adsorption tower 60a performs an adsorption process, the adsorption tower 60b performs a pressure uniformization process, and the adsorption tower 60c performs a pressure uniformization process. Thereafter, the adsorption tower 60a performs an adsorption process, the adsorption tower 60b performs a pressurization process, and the adsorption tower 60c performs a blowing-down process. When the valve 66c is opened, an off gas (residual gas) produced by the blowing-down process in the adsorption tower 60c is discharged into the off-gas discharge passage 68. The adsorption tower 60c then performs a purging process (see FIG. 2).

As shown in FIG. 1, the off-gas discharge passage 68 is connected to the off-gas passage 76 through the off-gas ejector 74. The off gas that is discharged into the off-gas discharge passage 68 is delivered to the combustor 20 by the off-gas discharging air (compressed air) that is supplied from the off-gas discharging air supply passage 36 to the off-gas ejector 74. The off gas is used as a combustion fuel by the combustor 20.

The adsorption towers 60a, 60b, 60c thus successively perform the adsorption, depressurization, pressure uniformization, blowing-down (desorption), and purging processes to enable the PSA mechanism 48 to refine the fuel gas continuously. The fuel gas is supplied from the fuel gas passage 82 to the storage assembly 16 when the valves 80a, 80b, 80c are selectively opened and closed.

Figure 4:
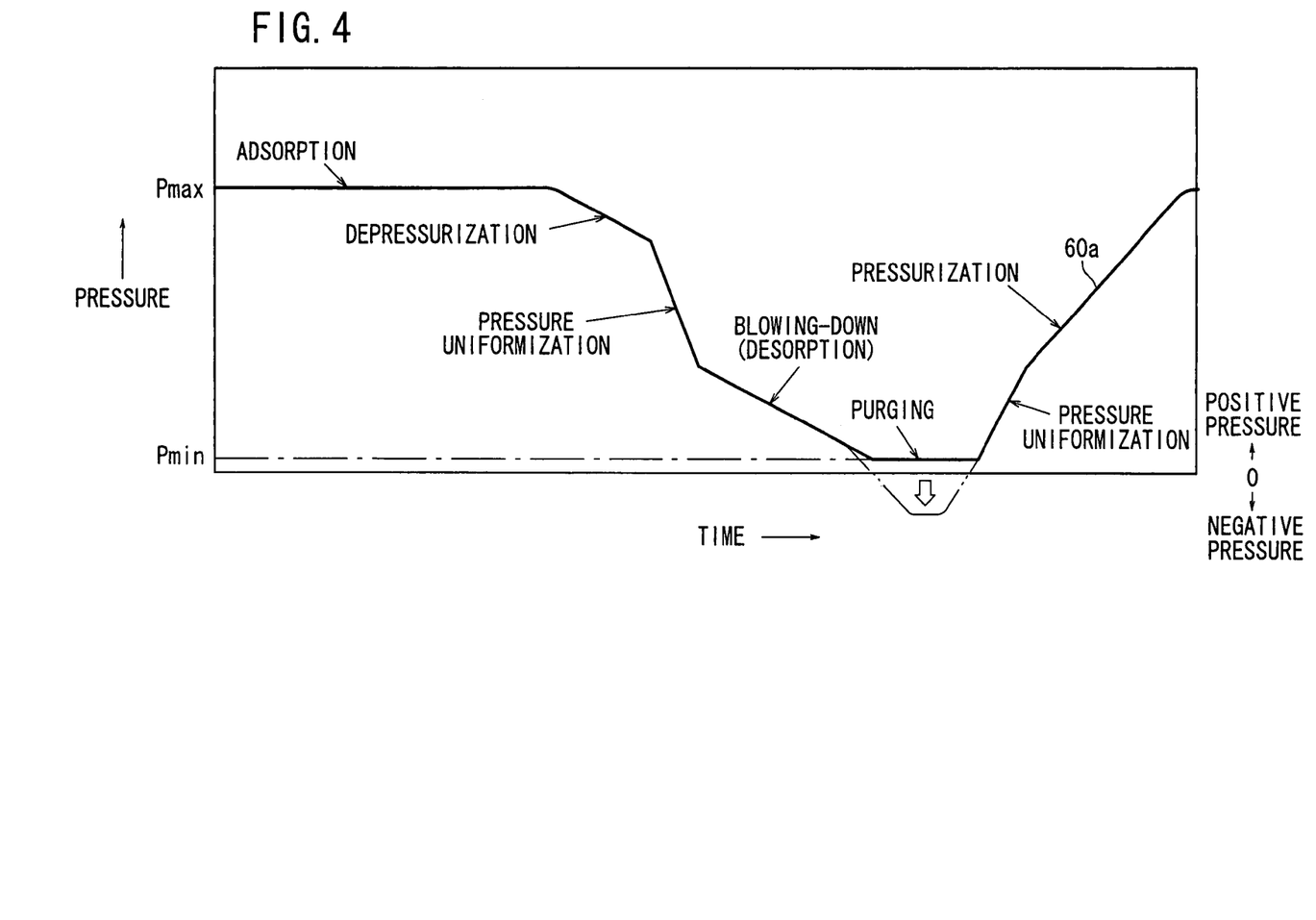
FIG. 4 is a timing chart illustrative of the manner in which an adsorption tower of the PSA mechanism operates.

If the off-gas ejector 74 is not in use, the pressure in the adsorption tower 60a, for example, varies as shown in FIG. 4. In the blowing-down (desorption) process performed by the adsorption tower 60a, the adsorption tower 60a discharges the off gas. In the purging process after the off gas is discharged, the pressure at which the off gas is supplied from the adsorption tower 60a is 0 kPa, and hence the pressure in the adsorption tower 60a is a minimum pressure Pmin.

The ability of the PSA mechanism 48 to adsorb the hydrogen-rich gas may be increased by increasing the maximum pressure Pmax to increase the adsorbed amount of the hydrogen-rich gas or exerting the minimum pressure Pmin as a negative pressure to regenerate the adsorbent.

According to the present embodiment, after the adsorption of the off gas is finished, i.e., in the purging process, a negative pressure is developed in the adsorption tower 60a to regenerate the adsorbent. Specifically, as shown in FIGS. 1 and 2, the off-gas ejector 74 is connected to the off-gas discharging air supply passage 36 and the off-gas passage 76, and the off-gas discharge passage 68 from the PSA mechanism 48 is connected to the off-gas ejector 74.

When the air compressor 30 operates, the off-gas discharging air, i.e., the compressed air, supplied from the air compressor 30 to the off-gas discharging air supply passage 36 flows through the off-gas ejector 74 into the off-gas passage 76, drawing the off gas from the off-gas discharge passage 68.

At this time, the valves 78a through 78c and the valves 80a through 80c are closed, and the valve 70 is open. The off gas that is discharged from the adsorption tower 60a in the blowing-down process, for example, is drawn by the off-gas ejector 74 from the off-gas discharge passage 68 into the off-gas passage 76, and supplied to the combustor 20.

Figure 5:
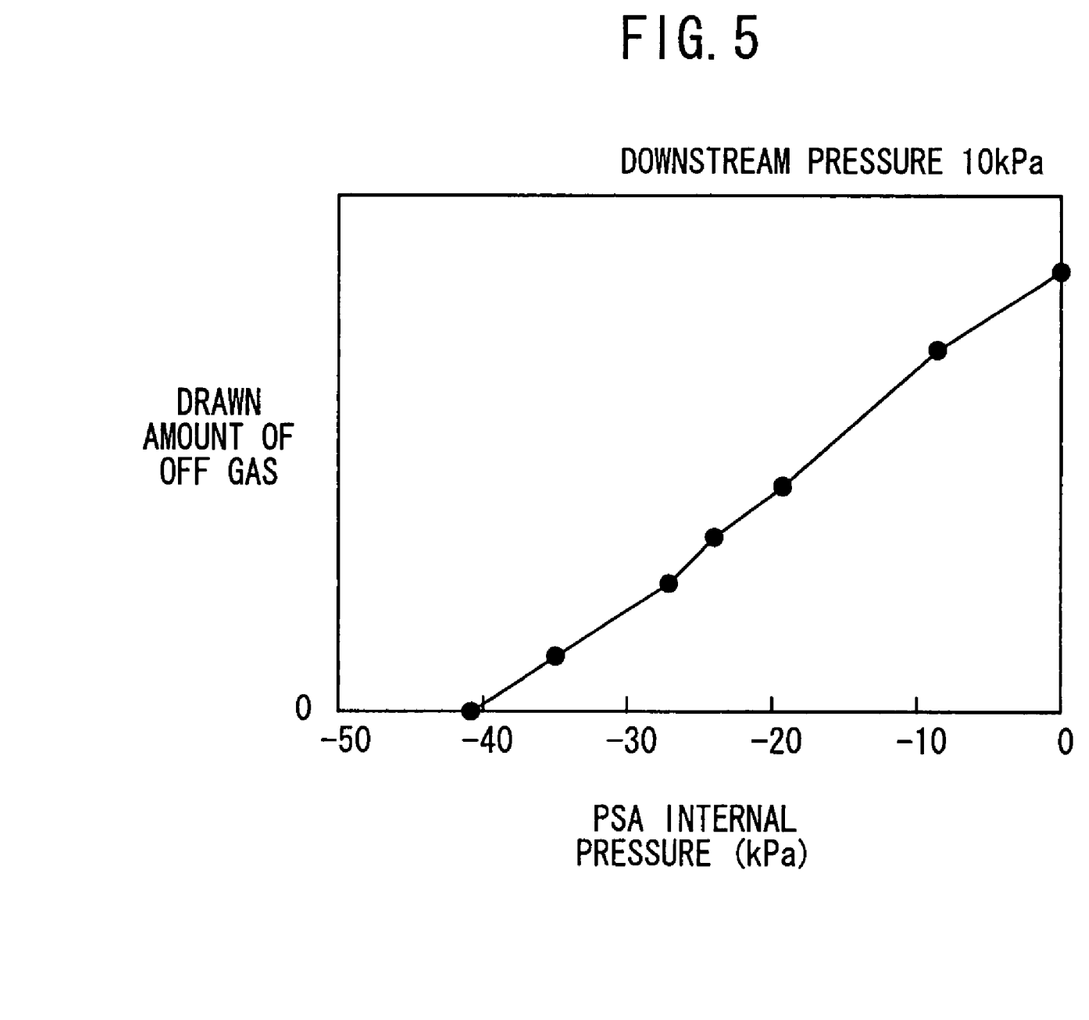
FIG. 5 is a diagram showing drawing characteristics of an off-gas ejector.

As the amount of the off gas in the adsorption tower 60a decreases, the pressure in the adsorption tower 60a becomes negative (see FIG. 5). At this time, essentially no off gas remains in the adsorption tower 60a, and a negative pressure is developed in the adsorption tower 60a in the purging process as indicated by negative pressure areas A in FIG. 3, regenerating the adsorbent in the adsorption tower 60a. Since the off gas is drawn from the adsorption tower 60a until the amount of the off gas becomes nil in the adsorption tower 60a, the adsorbent in the adsorption tower 60a is reliably regenerated under the negative pressure.

In the adsorption towers 60b, 60c, similarly, a negative pressure is developed in the purging process as indicated by the negative pressure areas A in FIG. 3, regenerating the adsorbent in the adsorption towers 60b, 60c. Therefore, the PSA mechanism 48 has its refining ability increased, and may be smaller in size than conventional PSA mechanisms which have the ability to refine the same amount of fuel gas. The increased refining ability of the PSA mechanism 48 is achieved simply by connecting the off-gas ejector 74 to the off-gas discharge passage 68, and hence the PSA mechanism 48 is much simpler in structure than if a negative-pressure pump were employed. Consequently, the home fuel gas refining system 10 is effectively made compact as a whole.

When the pressure at which the residual gas is supplied from the PSA mechanism 48 reaches 0 kPa, the off gas that remains in the PSA mechanism 48 is forcibly discharged by being drawn by the off-gas ejector 74.

According to the present embodiment, as shown in FIG. 1, the modification fuel ejector 40 is connected to the air compressor 30. The modification fuel supply source (not shown) is connected to the modification fuel ejector 40 through the atmospheric pressure regulating valve 42. The pressure at which the modification fuel is supplied is regulated to 0 kPa by the atmospheric pressure regulating valve 42.

Figure 6:
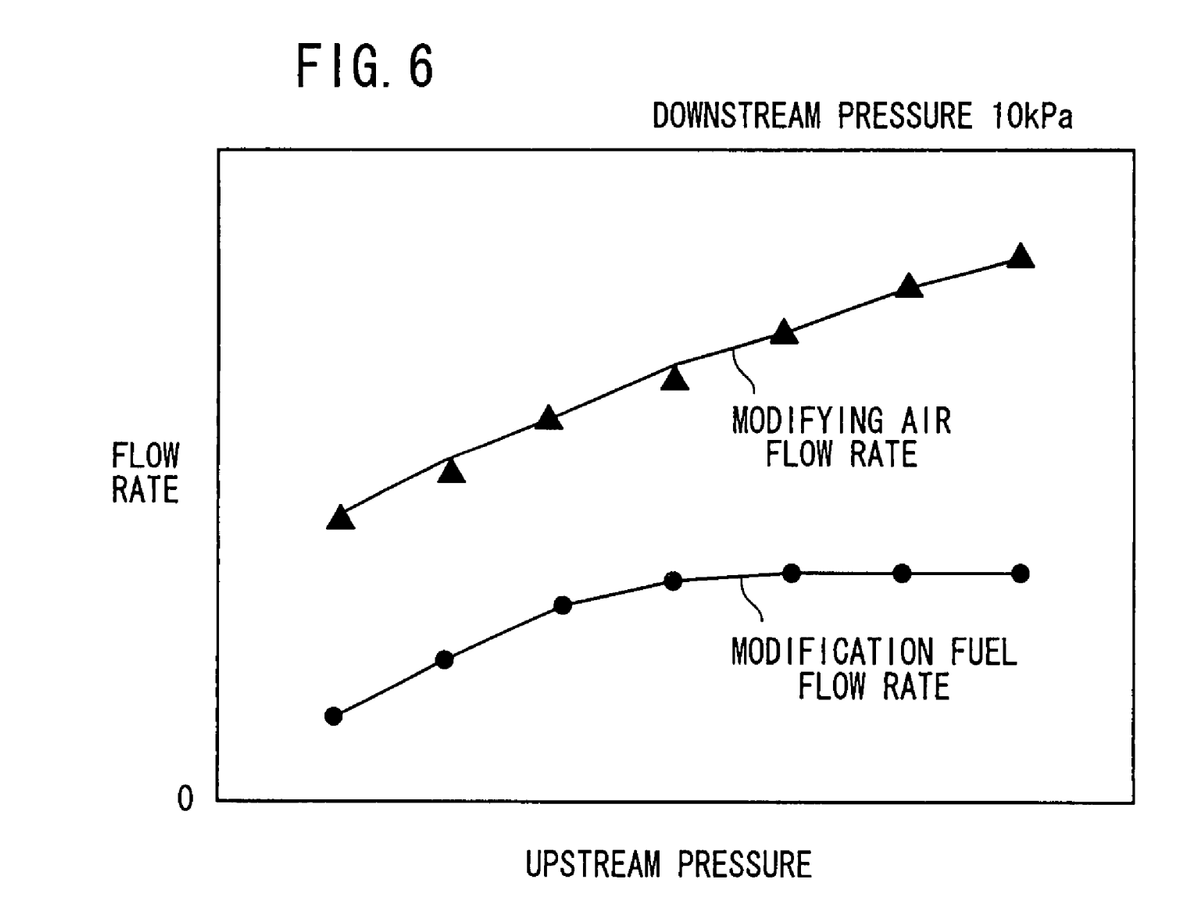
FIG. 6 is a diagram showing characteristics of a modifying fuel ejector.

When the modifying air (compressed air) is supplied from the air compressor 30 to the modification fuel ejector 40, the modifying air and the modification fuel that is drawn by the modification fuel ejector 40 flow at respective flow rates as shown in FIG. 6. Since the pressure at which the modification fuel flows is regulated to 0 kPa, the flow rate of the modification fuel is equal to the rate at which the modification fuel is drawn by the modification fuel ejector 40.

The fuel modifying reaction in the present embodiment is the automatic thermal process, and the catalyst in the reactor 22 needs to be kept constant. Therefore, the temperature of the catalyst in the reactor 22 is detected by the temperature sensor 44, and the valve 38a is controlled based on the detected temperature of the catalyst to regulate the pressure upstream of the modification fuel ejector 40, thereby controlling the flow rate of the modifying air.

Though the flow rate of the modifying air varies depending on the pressure upstream of the modification fuel ejector 40, the flow rate of the modification fuel essentially does not vary within the range of pressures upstream of the modification fuel ejector 40. Therefore, the modification fuel can stably be supplied at a constant rate. As no pressure booster pump is required to supply the modification fuel, the home fuel gas refining system 10 is relatively simple in structure and small in size. In addition, the temperature of the catalyst in the reactor 22 can be controlled simply by controlling the valve 38*a*.

The modification fuel ejector 40 and the off-gas ejector 74 are connected to the single air compressor 30. Accordingly, the home fuel gas refining system 10 is also further simplified in structure.

Although a certain preferred embodiment of the present invention has been shown and described in detail, it should be understood that various changes and modifications may be made therein without departing from the scope of the appended claims.

What is claimed is:

1. An apparatus for manufacturing a fuel gas, comprising:
   a modifier for modifying a hydrogen-containing fuel to produce a modified gas;
   a refiner having a PSA mechanism for removing unwanted materials from said modified gas to refine a hydrogen-rich fuel gas; and
   a residual gas supply for supplying a residual gas from a tower of said PSA mechanism to a heater;
   said residual gas supply comprising:
      a residual gas passage connected to a compressed-air supply source, said PSA mechanism and said heater; and
      a residual-gas ejector disposed in said residual gas passage and coupled to the PSA mechanism for drawing the residual gas from the tower of said PSA mechanism with compressed air supplied from said compressed-air supply source and flowing through said residual gas passage.

2. An apparatus according to claim 1, wherein said modifier comprises:
   an evaporator for evaporating said hydrogen-containing fuel;
   said heater comprising a combustor combined with said evaporator.

3. An apparatus according to claim 1, wherein said compressed-air supply source comprises a compressor connected to a modifying-air supply passage communicating with said modifier and said residual gas passage.

4. An apparatus according to claim 3, wherein said modifier comprises:
   a hydrogen-containing fuel ejector disposed in said modifying-air supply passage for drawing said hydrogen-containing fuel with modifying air supplied from said compressor and flowing through said modifying-air supply passage.

5. An apparatus according to claim 4, wherein said modifier comprises:
   an atmospheric pressure regulating valve disposed between said hydrogen-containing fuel ejector and a hydrogen-containing fuel supply source for supplying said hydrogen-containing fuel.

6. An apparatus according to claim 4, wherein said modifier comprises:
   a temperature sensor for detecting the temperature of a modifying catalyst to regulate a pressure upstream of said hydrogen-containing fuel ejector.

* * * * *